(No Model.)

M. GLAUBER.
PIPE COUPLING OR CONNECTION.

No. 594,526. Patented Nov. 30, 1897.

WITNESSES:
Fr. N. Roehrich.
M. F. Boyle.

INVENTOR
Max Glauber
BY
Thomas Drew Stetson
ATTORNEY

UNITED STATES PATENT OFFICE.

MAX GLAUBER, OF NEW YORK, N. Y.

PIPE COUPLING OR CONNECTION.

SPECIFICATION forming part of Letters Patent No. 594,526, dated November 30, 1897.

Application filed February 27, 1897. Serial No. 625,318. (No model.)

*To all whom it may concern:*

Be it known that I, MAX GLAUBER, a citizen of the United States, residing in New York city, in the county and State of New York, have invented a new and useful Pipe Coupling or Connection, of which the following is a specification.

My improved coupling is adapted for making pipe connection with vessels of any kind having a plain hole. The devices proposed for attaining this end have been attended with serious objections from involving too many separate parts or requiring clamping means which stand in the path of the water and obstruct its flow. Hooks have been made to engage the bowl, each in one piece, with the half of a short tube externally threaded and arranged so that the two halves conjointly present a threaded short tube suitable for the application of a washer of rubber or the like and a tight-fitting internally-threaded part serving as a lock-nut and as the connection for the water-pipe. My improvement is of that class. In all prior constructions comprising two detached parts heretofore known to me trouble is experienced when it becomes necessary to make the joint in dark places and places only partially accessible, as it is difficult to secure the exact registration of the threads and either of the parts is readily liable to become lost. I provide a connection capable of being applied from the outside and assuring the proper registration of the threads of the respective halves. It may serve for uniting a cock or pipe to tubs, casks, or tanks of various kinds, but is more particularly designed for connecting the water-pipe with the flushing-rim of a water-closet bowl after the laterally-projecting horn which permitted a bushing to be secured thereto has been by any means broken off. I will describe it as thus applied.

Figure 1:
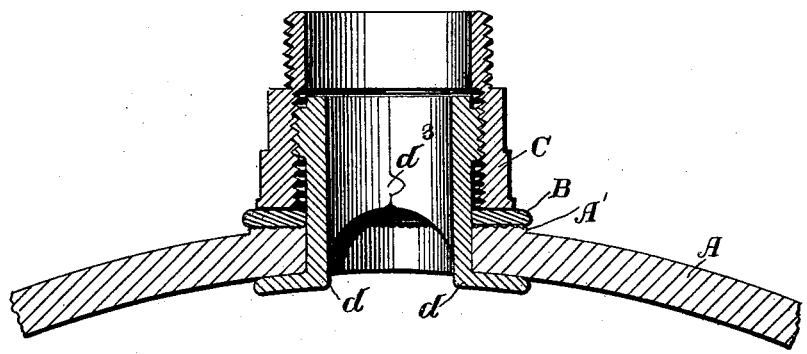
Figure 2:
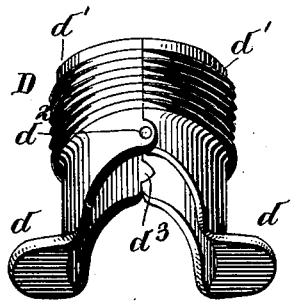
Figure 3:
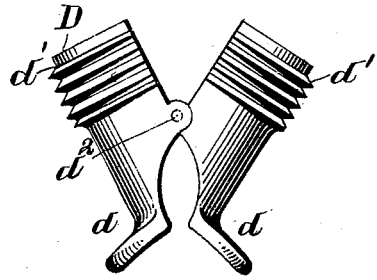
Figure 4:
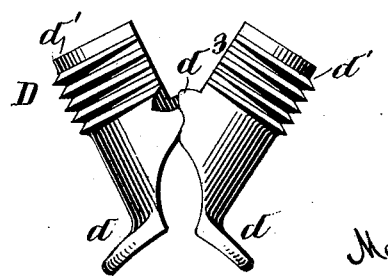

In the drawings accompanying this specification, Figure 1 is a horizontal section showing a portion of a water-closet bowl connected with the water-pipe by my improved joint or connection. Fig. 2 is a perspective view of the novel attaching-arms and hooks tapered to allow the arms to be contracted, so that the hooks may be brought close together and of the sectional tube integral therewith. Fig. 3 is a view of the parts in Fig. 2 and showing the arms in a contracted position. Fig. 4 is a view corresponding to Fig. 3, but showing the other side.

Similar letters of reference indicate corresponding parts in all the figures where they appear.

In Fig. 1 I have shown the bowl A as having the stub A' of the horn which has been broken off, as previously explained. The face of the stub forms the bearing of a rubber washer B, which is capable of making a tight joint under the pressure exerted by a lock-nut C, having a standard thread for connection with the water-pipe. Before the lock-nut is applied the novel device D, comprising the two sections, consisting of the engaging arms $d\ d$ and half-tube sections $d\ d'$, is adjusted. This device involves two parts, the body portion of each of which presents half of an externally-threaded tube-section and an integral extension which contracts toward its end, where it terminates in the outwardly-bent arm $d$. With a view of maintaining the threads of the two body portions in registering relation when brought together the sections are pivotally fastened together at one side, as indicated at $d^2$, their proper engagement at the other side being provided for by a tongue and notch $d^3$, located diametrically opposite the pivoted connection, which allows a very simple construction and reduces the cost of manufacture. The single pivotal connection is all that is required to keep the parts together when out of use and to insure the proper association of the two sections for service. The arm extensions of the device D thus described are from the center outward contracted, (see Fig. 3,) so that being properly turned on their centers they may readily receive the washer and be inserted through the openings in the bowl, after which the tubular threaded ends of the sections are brought together, as indicated in Figs. 1 and 2, to constitute the short tube, the arms spreading and positively engaging the bowl A, as illustrated in Fig. 1, the lock-nut C being then applied and screwed into position to firmly clamp the several parts.

Connection may be made between the lock-nut and the water-pipe by the aid of the external threads on the lock-nut or in any other desired manner. The joint or connection thus established can be easily made and will be firm and water-tight.

The contracting form of the arm extensions affords them sufficient play to permit them to be readily moved together.

A tongue and notch of a simple U shape will afford satisfactory engagement at $d^3$.

I claim as my invention—

In a pipe joint or connection for water-closets and the like, the device D comprising the sections presenting the threaded tube portions and attaching-arms for the bowl or basin, said arms being pivotally secured at one side and having a tongue-and-notch engagement at the other, in combination with a suitable lock-nut, substantially as herein specified.

In testimony that I claim the invention above set forth I affix my signature in presence of two witnesses.

MAX GLAUBER.

Witnesses:
J. B. CLAUTICE,
M. F. BOYLE.